United States Patent [19]

Kesten

[11] Patent Number: 4,614,176
[45] Date of Patent: Sep. 30, 1986

[54] CATALYTIC METAL HYDRIDE SPACE HEATER

[75] Inventor: Arthur S. Kesten, W. Hartford, Conn.

[73] Assignee: United Technologies Corporation, Hartford, Conn.

[21] Appl. No.: 790,683

[22] Filed: Oct. 23, 1985

[51] Int. Cl.[4] ............................................. F24H 3/02
[52] U.S. Cl. ........................ 126/110 R; 126/116 R; 432/222; 431/328
[58] Field of Search .................... 432/222; 126/116 R, 126/110 R; 431/170, 328

[56] References Cited

U.S. PATENT DOCUMENTS

| | | | |
|---|---|---|---|
| 3,916,869 | 11/1975 | Dufour | 126/110 R |
| 4,165,569 | 4/1979 | Mackay. | |
| 4,253,428 | 3/1981 | Billings et al. | |
| 4,262,739 | 4/1981 | Gruen et al. | |
| 4,393,924 | 7/1983 | Asami et al. | |
| 4,402,915 | 9/1983 | Nishizaki et al. | |
| 4,457,136 | 7/1984 | Nishizaki et al. | |

*Primary Examiner*—Carroll B. Dority, Jr.
*Attorney, Agent, or Firm*—A. Dean Olson

[57] ABSTRACT

An apparatus for heating air wherein the combustion is dispersed in direct proximity to a metal hydride fuel storage means in order that the combustion heat effects the release of hydrogen from the metal hydride. The combustion area contains a catalyst and a semipermeable membrane separates the hydride fuel storage means and the combustion area. The temperature of the metal hydride is raised to effect initial release of hydrogen which passes through the semipermeable membrane, mixes with air and is combusted at the catalyst. The heat of combustion, in direct proximity to the metal hydride, perpetuates the hydrogen release.

1 Claim, 1 Drawing Figure

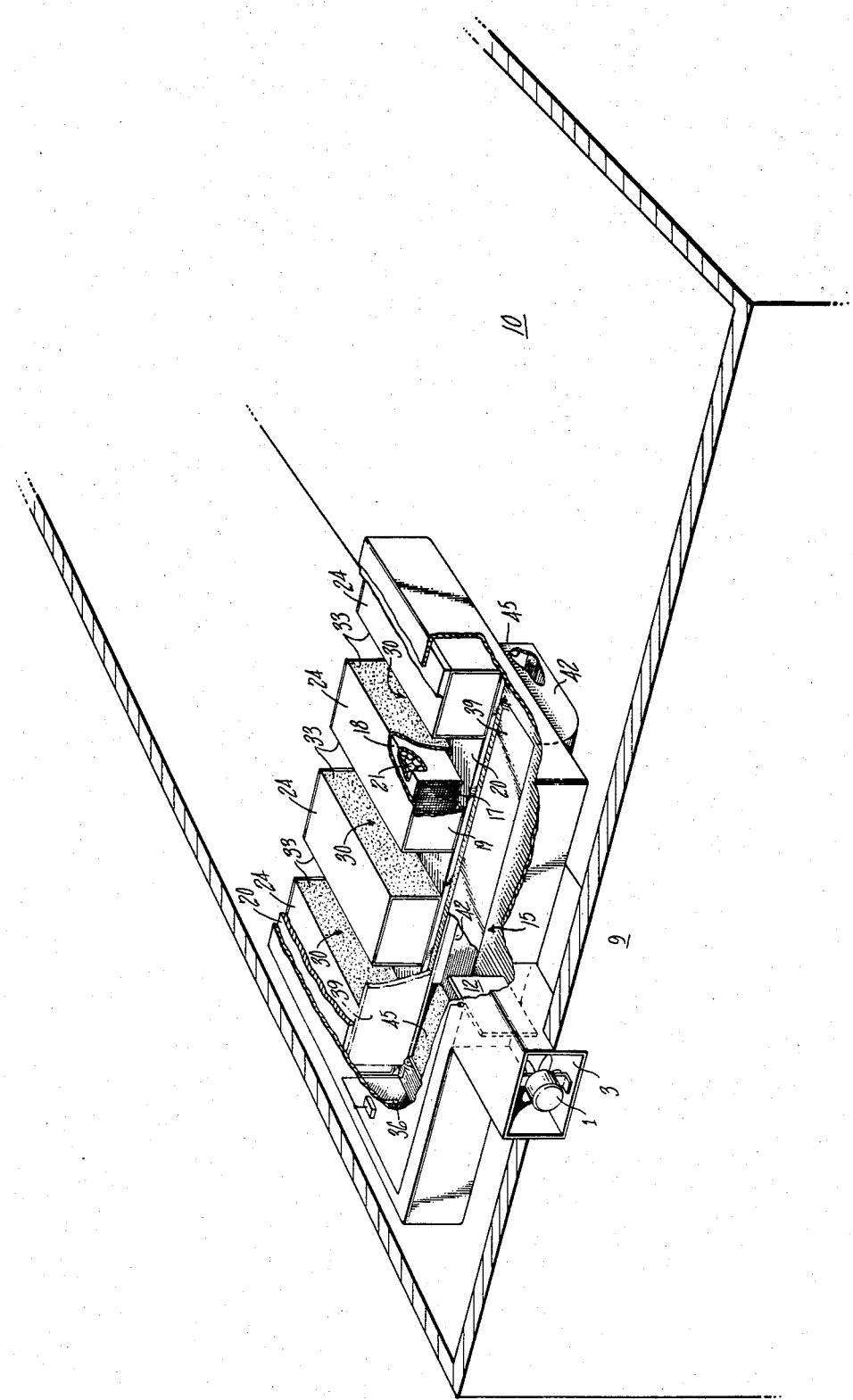

4,614,176

CATALYTIC METAL HYDRIDE SPACE HEATER

DESCRIPTION

1. Technical Field

The field of art to which this invention pertains is heating systems, particulary space heating systems.

2. Background Art

Energy management in buildings requires that indoor air be heated in cold weather to overcome losses due to heat conduction throughout the structure and convection due to leakage around windows, doors and other ports. Even with well insulated and tighter buildings, indoor air replacement is necessary to clear the air of pollutants formed from cooking, smoking, etc. Heating requirements can be reduced where outdoor air being brought in is heated by exchange with the indoor air being replaced. However, current heating methods are indirect; they involve burning a fuel at some central location, transferring the energy from that fuel to a fluid and a heat exchanger, and then transferring the energy from that fluid or secondary fluid through another heat exchanger to the air to be warmed. Alternative methods of heating using electricity are even less efficient.

Accordingly, there is a constant search in this art for alternative apparatuses for efficiently heating building interiors.

DISCLOSURE OF INVENTION

This disclosure is directed to an efficient apparatus for heating air using a catalytic metal hydride combustion system. The heating apparatus comprises a fuel storage means which contains a metal hydride fuel storage means. A combustion area which contains a catalyst is dispersed in direct proximity to said metal hydride fuel storage means and a semiporous membrane separates the combustion area and metal hydride fuel storage means. The combustion heat passes into said metal hydride fuel storage means effecting the release of hydrogen from the metal hydride.

This catalytic metal hydride space heater provides direct contact heat exchange, humidification of the air, and in addition, is nonpolluting. Thus, this invention makes a significant advance in the field of heating systems.

The foregoing and other objects, features and advantages will be apparent from the specification, claims and from the accompanying drawings which will illustrate an embodiment of the invention.

BRIEF DESCRIPTION OF DRAWING

The FIGURE is a schematic diagram of an exemplary catalytic metal hydride space heater.

BEST MODE FOR CARRYING OUT THE INVENTION

A clear understanding of this invention may be had by reference to the FIGURE which illustrates an exemplary catalytic metal hydride space heater. In the FIGURE, a fan 1 directs air through a conduit neck 3 which lines an opening in the wall 9 of the room 10 which requires heating. The air passes through open valve 12, which is preferably a throttle valve in order that it can regulate combustion, and into the mixing and distributing area 15. A fuel storage means comprises a metal hydride fuel storage means. For example, a plurality of container canisters 18 having a porous structural material at one end 17 are contained by a plurality of housings 24. The housing(s) have a layer of semipermeable membrane 19 at the surface which mates with the porous structural end 17 of the canisters 18. These canisters are filled with metal hydride 21. Operational startup is accomplished by an initial heating of the hydride with an electric starter heater 20 effecting release of hydrogen. The hydrogen passes through the porous membranes 17 and 19 of the canister 18 and housings 24 respectively and mixes with the air in the mixing and distributing area 15.

The metal hydrides can be any metal hydrides which can store and release hydrogen at the temperatures described below such as lanthanum nickel, iron titanium and magnesium and its alloys such as magnesium nickel and magnesium copper. Typically, temperatures of about 90° C. to about 400° C. are sufficient to effect release. The metal hydride used is typically dependent upon the release temperature which in tune is dependent on the application. Thus, for home heating applications, a low temperature release operation would favor the use of iron titanium whose release temperature is 90° C. or lanthanum nickel which is more expensive but has a higher storage capacity. Other applications might utilize magnesium nickel which has a release temperature of 350° C. These metal hydrides are stored in replaceable canisters 18 which can be easily slipped in and out of the metal housing 24 and brought to a central processing facility for recharging. The semipermeable membrane 19 can be made of any material through which only hydrogen can diffuse. Preferably the semipermeable membrane is a palladium membrane as this is hydrogen selective and readily available. Typically, its thickness is about 0.01 milliimeters (mm) to about 10 mm. The particular thickness is a design parameter. Depending on the application, the thickness may vary to afford different diffusion rates. Those skilled in the art can readily determine the appropriate thickness using a source such as "Diffusion In and Through Solids" by Richard M. Barrer, Chapter 5 which is hereby incorporated by reference. Barrer describes the permeation velocity of hydrogen through metals like palladium.

The hydrogen and air mix in the mixing and distributing area 15 and flow through the catalytic combustion reactors 30 (which comprise a plurality of channels in fluid communication with the room 10) where combustion takes place at a layer of catalyst 33 which lines the combustion reactor 30 walls and is in direct proximity to the metal hydride fuel storage means 18. The catalyst material which lines the surface of these reactors promotes hydrogen oxidation even under ambient temperature conditions. Typically, the heat released by the catalytic reaction warms the air typically to a range of about 60° C. to about 400° C. as it passes through the reactor chambers 30 to the room 10 resulting in warming of the room 10. The air is also humidified, the extent of humidification being dependent, for example, upon the temperature the air is heated to. The temperature the air is heated to is a design parameter based on the application. By varying the membrane thickness and the oxygen throttle valve, the degree of combustion can be controlled. In addition, the heat release by the catalytic reaction provides heat to the metal hydride 21 in order to maintain release of the hydrogen which was initiated by the heaters 20. The catalytic reaction can be empirically illustrated as below:

$$2H_2 + O_2 \rightarrow 2H_2O$$

For the ambient temperature conditions under which the oxidation process is occurring, typically below about 400° C., the catalysts used for automotive exhaust gas clean-up are adequate. Thus, it is preferable that the catalysts comprise a small fraction of a platinum family metal on an aluminum substrate as this promotes oxidation of hydrogen at a low temperature, is efficient, and readily available. It is especially preferred that a platinum/iridium catalyst is used. The catalyst layer can range from a discontinuous layer to about 0.5 mm in thickness that can be bonded to, for example, metal. It is especially preferred that the surface area of the catalyst is large resulting in many active sites and that the catalyst layer is thin allowing for the easy diffusion to all catalyst sites. It is also possible to vary the above arrangement by placing the catlyst on the semipermeable membrane with a layer of ceramic between the catalyst and semipermeable membrane. The ceramic layer and its thickness, in addition to the permeabilities of the various layers, are selected to provide the desired rate of hydrogen diffusion heat transfer, and consequently hydrogen combustion.

Shutoff of this system can be effected by two systems. In an emergency system, a thermocouple 36 is connected to incoming air valve 12. When the thermocouple 36 senses that the temperature of the catalytic metal hydride space heater is rising above safe levels, it sends a command to the entry valve 12 closing the valve and eliminating the source of oxygen, thus effectively closing the combustion reactor down. In addition, the thermocouple 36 sends a command to open an exit valve 39 which leads to an exit channel 42. The air-hydrogen mixture in the mixing and distributing area 15 preferentially flows through open exit valve 39 to the exit channel 42 where the residual hydrogen is combusted on the catalyst 45 lined wall. This is because there is less resistance pressure in channel 42 than in combustion channels 30. For example, a 10 to 1 resistance ratio (resulting from size, etc.) between the combustion channels 30 and the exit channel 42 will ensure the pressure differential.

Under normal conditions, exit valve 39 can be opened to cut the airflow to the reactor chamber, thus cooling the metal hydride and slowing down the release of the hydrogen. This is because the hydrogen air mixture preferentially flows through exit channel 42 instead of combustion channels 30 as above. Residual hydrogen can be oxidized along the walls of the exit port 42 at the catalyst lining 45. Because combustion is reduced at the combustion channels 30 the temperature drops to the point where hydrogen release is neglible. At this point, the entrance valve 12 is closed to cut the air supply off. Although there is no restriction in the combustion channels 30 which would inhibit the transfer of air, air is inhibited during normal operation from passing from the room 10 through the channels 30 because of the greater pressures inside the heater during operation. When the pressure differential drops enough to allow air to enter, the reactor has cooled to a state where hydrogen is not being released and so the entrance of air is not a significant problem.

These space heaters operate at moderate temperatures and provide the direct heating of air eliminating heat exchange losses. In addition, the reaction product of the oxidation of hydrogen is water which eliminates the pollution associated with conventional heating systems. In addition, this system cleans the air by oxidation of partially oxidized hydrocarbons such as cooking odors. The start-up of this system can be effected by the warming of metal hydrides to release hydrogen eliminating a spark ignition system. And since metal hydrides pack up to five pounds per cubic foot of hydrogen a moderate sized (e.g. 10 cubic foot) heater would not require hydride replacement more than a few times per heating season. This catalytic metal hydride space heater can be used to advantage in a number of situations such as remote sites removed from conventional energy sources such as submarines, oil fields and battlefield stations where the low temperature operation can eliminate hotspots that are detectable. In addition, it can be used in chemical plants where it can take advantage of available hydrogen that is presently flared. This system's lack of pollution eliminates vents in present systems that exhaust heat and pollutants.

This invention provides a catalytic metal hydride space heater that eliminates heat exchange losses and is nonpolluting. Thus, it makes a significant advance in the field of heating systems.

It should be understood that the invention is not limited to the particular embodiment shown and described herein, but that various changes and modifications may be made without departing from the spirit or scope of this concept as defined by the following claim.

I claim:

1. An apparatus for heating comprising a fuel storage means and wall means forming a combustion area wherein the improvement comprises:
    (a) said fuel storage means comprising a metal hydride fuel;
    (b) said wall means forming said combustion area containing a catalyst thereon;
    (c) said wall means forming said combustion area being in direct proximity to said metal hydride fuel storage means;
whereby combustion heat passes into said metal hydride fuel storage means affecting the release of hydrogen from the metal hydride;
    (d) means for controllably supplying air to said combustion area;
    (e) said fuel storage means including a semipermeable membrane through which hydrogen may pass;
    (f) means for conveying hydrogen from said semipermeable membrane to said combustion area; and
    (g) means for discharging products from said combustion area to an area to be heated.

* * * * *